May 28, 1963 W. P. HENRY 3,091,197
FERTILIZER APPLYING DEVICE
Filed Feb. 13, 1959 2 Sheets-Sheet 1

WILLIAM P. HENRY
INVENTOR.

BY Smith & Tuck

May 28, 1963  W. P. HENRY  3,091,197
FERTILIZER APPLYING DEVICE
Filed Feb. 13, 1959  2 Sheets-Sheet 2
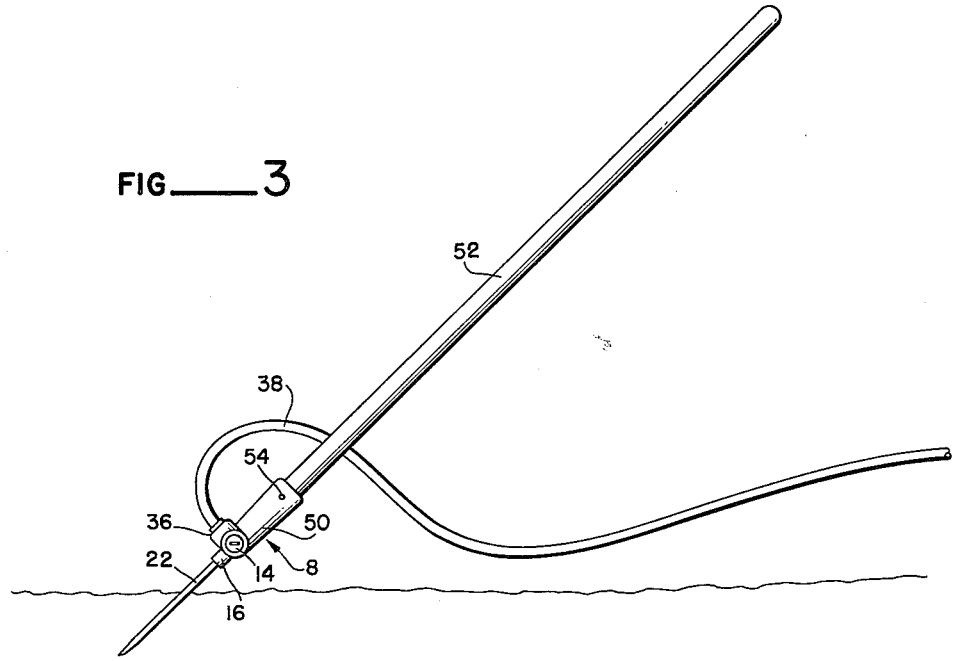
FIG. 3
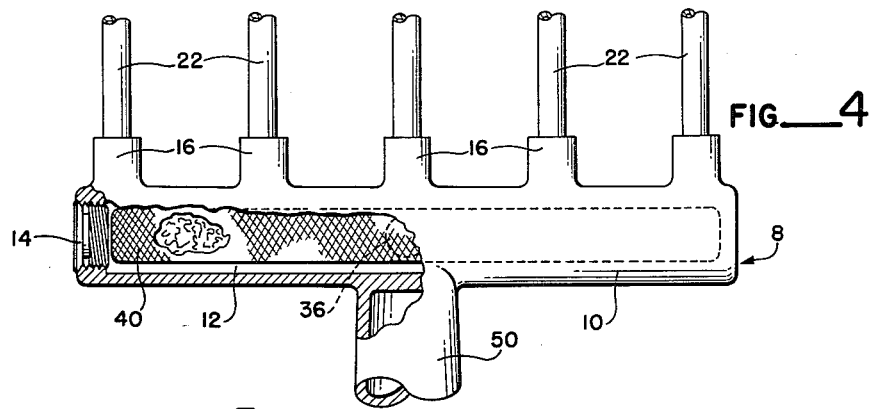
FIG. 4
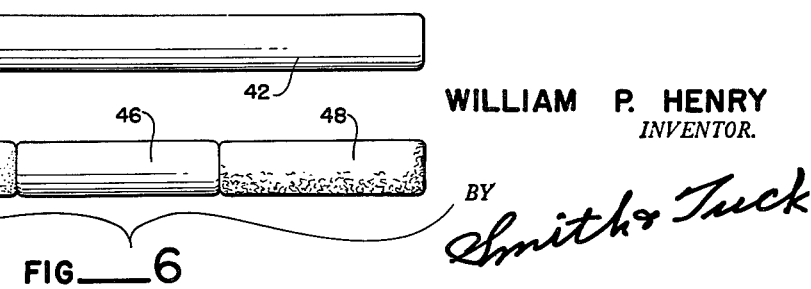
FIG. 5
FIG. 6
WILLIAM P. HENRY
*INVENTOR.*
BY Smith & Tuck

United States Patent Office 3,091,197
Patented May 28, 1963

3,091,197
FERTILIZER APPLYING DEVICE
William P. Henry, Seattle, Wash., assignor of fifty percent to Darrell J. Nash, Seattle, Wash.
Filed Feb. 13, 1959, Ser. No. 793,078
1 Claim. (Cl. 111—7.1)

This invention relates to the general art of devices used in applying fertilizer to soil. More particularly this invention relates to a device made as a substantial fork having a hollow, fertilizer receiving header to which are secured a plurality of aligned hollow tines to which water is distributed by means of a hose connected to a source of water under pressure. This application is a continuation in part of my U.S. patent application Serial Number 569,528, now abandoned.

In the past many devices have been produced having as their general purpose the injection of water soluble fertilizers into the soil by means of jet-like devices. However, of the numerous types studied, they appear to have certain disadvantages that make is difficult to conveniently use the devices for their intended purpose. I believe I have made a marked improvement over those devices observed by providing a plurality of aligned nozzles or jets which are arranged as components of a fork having a convenient handle and a substantial, hollow transverse member to which the handle is secured and to which the jet members are also secured. Water under pressure is led to the hollow transverse member, which may be charged with a suitable fertilizer and then led to the jet members so that easy multiple penetrations of the soil can be achieved and the fertilizer deposited deep into the ground.

A principle object of this present invention, therefore, is to provide a rugged tool having a plurality of jet members arranged as tines of a fork would be arranged and to have the same supplied with water under pressure to the end that deep filtration can be easily achieved with little if any force required to press the tines into the ground.

A further object of this present invention is to provide means for dispensing water soluble fertilizer from the ends of the tine-like nozzles to the depth desired in the soil being treated.

A further object of this present invention is to provide, as part of the metal fork structure, a fertilizer receiving chamber in which water soluble fertilizer can be placed as a charge to be dissolved by the water, under pressure, as supplied to the header by a suitable hose.

A further object of this invention is to provide a convenient charging means so that various mixtures of fertilizers can be introduced into the fertilizer chamber in a single charge so that the fertilizer can be accurately adapted to the needs of the ground being treated.

Further objects, advantages and capabilities are disclosed in the drawings, or may be comprehended or are inherent in the device.

In the drawings, throughout which like reference numerals indicate like parts,

FIGURE 3 is a side elevation of the fertilizing device showing one manner in which the device can be conveniently used.

FIGURE 4 is a fragmentary face view of the fork portion of my device with certain portions broken away and sectioned and particularly illustrating a charging container for use in handling granular fertilizers.

FIGURE 5 is a side elevation of one of the more common commercial stick fertilizers in which a number of ingredients are bound together in stick form.

FIGURE 6 is a bracketed view illustrating how a number of different types of fertilizers may be used in combination to make up a cartridge so that a variety of fertilizers may be employed at the same time.

Figure 2:
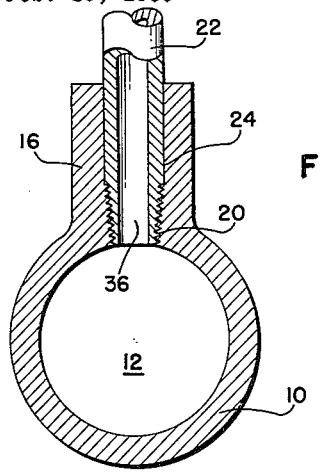
FIGURE 2 is a typical cross-sectional view along line 2—2 of FIGURE 1, through one of the tines and the header, the same being shown in fragmentary form and on an enlarged scale.

Referring more particularly to the disclosure in the drawings, the numeral 8 designates generally the metal fork-like portion of my device. The fork member consists of a tubular header portion 10 which is hollow in order to provide a fertilizer receiving chamber 12. A plug 14 is screwed into header 10 to contain fertilizer that has been placed in the chamber 12 thus insuring that the water will come in intimate contact with the fertilizer contained therein.

Figure 1:
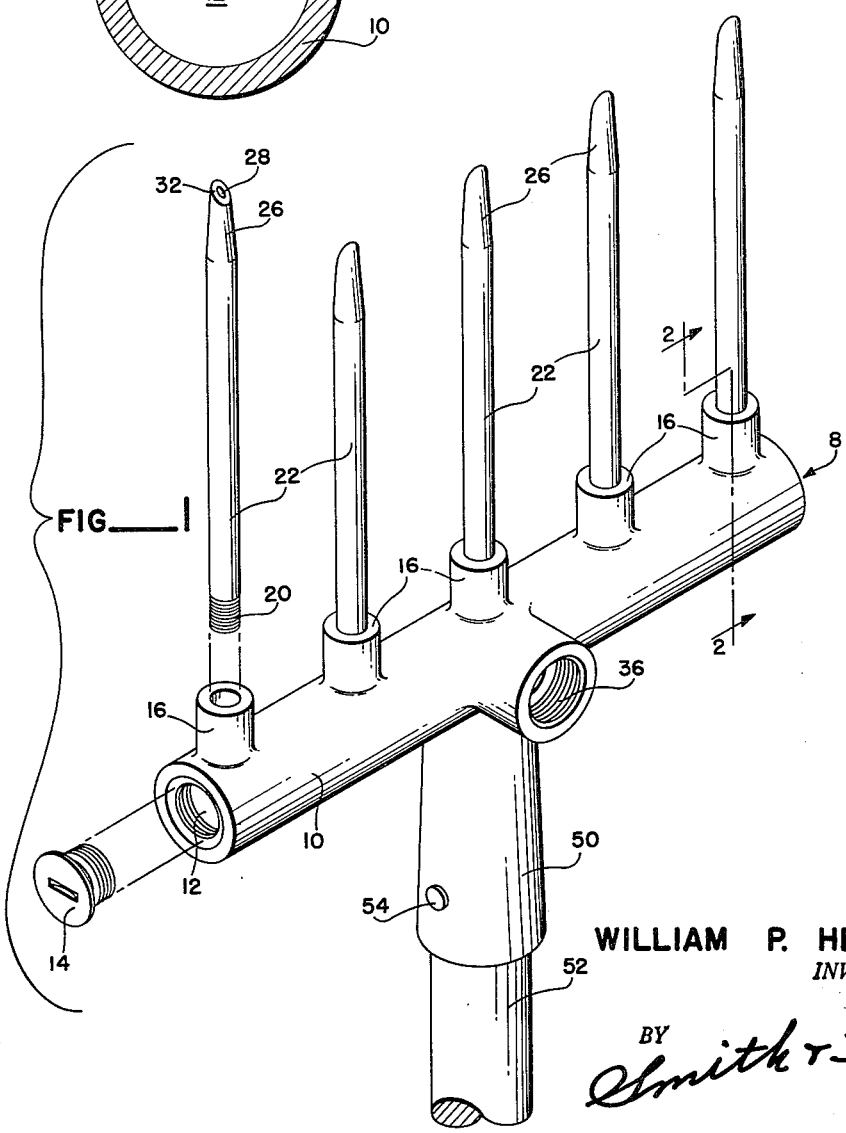
FIGURE 1 is a perspective view partly exploded and showing the metal portions of the device.

Disposed in alignment are a plurality of tine bosses. These bosses communicate with chamber 12 and are interiorly threaded with a pipe thread as at 20 so that the tubular tines 22 may be threadedly secured in communication with chamber 12. Referring particularly to FIGURE 2 it will be noted that the threads 20 are in the lower portion of boss 16 and for a considerable distance above the threads is a supporting guide, indicated at 24, which provides a snug fit for tines 22 to give them additional strength against prying effort and to prevent any bending of the threaded portion which might tend to break the tines off at this point. The threaded portion 20 is in the upper portion of boss 16 as viewed in FIGURE 3. The discharge end is at the end of the tine farthest removed from the supporting guide 24 and the threaded end 20 of the tine. The extreme discharge ends of all the tines are uniformily machined. Tines 22 are preferably swedged down into generally pointed nozzle portion 26 in which the water discharge opening 28 is substantially reduced in cross sectional area from the bore 30 of the tubular tine 22. It has further been found desirable to have the extreme ends of the tines cut at an angle of 20° to 30° to the longitudinal axis thereof substantially after the showing of FIGURE 1. This bevel cut is illustrated at 32. It is noteworthy that the extreme length of the tine is positioned as shown in FIGURES 1 and 3 and when prying effort is placed upon the fork this positioning tends to shield the water discharge opening 28 and prevent clogging with soil or particularly with small gravel and the like.

On the side of header 10 which supplies a plurality of tines 22 is the hose connection boss 36, which is preferably centrally disposed with respect to the header's length and at right angles to the axis of the tines.

In FIGURES 4, 5 and 6 are illustrated three different ways of charging chamber 12 with suitable fertilizer.

In FIGURE 4 a porous tube 40 is employed. This is normally made of metal not attacked by the fertilizing agents employed in the presence of water. Stainless steel has proven to be quite satisfactory and many of the nonferrous metals may also be successfully used. The container may be made of perforated sheet metal or of woven wire screen. It is preferably provided with openings that are as large as the granular form of the fertilizer used so that maximum circulation of water through the fertilizer can be effected.

In FIGURE 5 is illustrated a typical fertilizer stick in which a number of fertilizers are combined with a binder to form a rigid stick 42 which may then be inserted in chamber 12 without an enclosing screen of any kind.

In FIGURE 6 is illustrated a method of charging my device that is particularly suitable where special fertilization is required for specific soil treatment and particularly for the treatment of shrubs and flowers of various types where it is desirable to put the fertilizer directly into the root area and to have it compounded of a number of different ingredients as 44, 46 and 48 which are especially suited for the particular need. This present form of charging in small increments which make up the general stick form of FIGURE 6 makes it very convenient to make the desired fertilizer formulation at any time, as partially consumed stakes can be withdrawn from chamber 12 and replaced with other increments as necessary in changing from one type of plant to another.

The handle socket 50 formed as part of the fork unit and fixedly as part of header 10 is adapted to receive handle 52 which in turn is secured therein by a rivet preferably passing through opening 54 in the socket member.

*Method of Use*

In using my device the fertilizer chamber 12 is charged with an appropriate fertilizer of any of the forms shown in FIGURES 4, 5 or 6. These fertilizers should be of the type that are not readily soluble but which will require several hundreds of gallons of water to completely dissolve them. Hose 38 is connected to a suitable source of water under pressure and should have a capacity of approximately ten gallons of water per minute so that a combined watering and fertilizing of the plant takes place. This is desirable so that the entire sub-surface soil around the plant or around the grass roots will be more or less uniformly treated, which of course would not be true if a small amount of water was used to place a relatively large amount of fertilizer.

My device may be very conveniently used in the slanting position illustrated in FIGURE 3 as this makes it possible to get quite close to the growing stock of a plant or shrub insuring that the large mass of roots will be well irrigated as well as fertilized. In the treatment of lawn however it is usually more convenient to hold handle 50 in a vertical position.

The exact manner of using my fertilizing fork will depend somewhat on the local conditions, especially the texture and firmness of the soil. With a flow of ten gallons per minute each of the five nozzle-like tines 22 would then have two gallons of water per minute discharged from them, and, being discharged from a relatively small nozzle bore 28 there would be a pronounced jetting effect so that the fork in most ground can be hand held and will sink by its own weight into whatever depth desired within the length of the tines 22. In soil that is compacted or in sod that is thickly matted with roots it may be desirable to press the fork down into the subsoil by pressing down with the foot on header 10 as in using a spading fork or shovel. Under such conditions of compacted soil it may then be desirable to rock handle 52, particularly in a plane normal to the plane of the tines. This will assist in penetration and also greatly increase the area coming immediately into contact with the fertilizer bearing stream of water. In this way the water can be more readily absorbed into the compacted soil. It is under these conditions that it is very desirable to use the rather rugged form of construction which has been illustrated throughout the accompanying drawings, and it also points to the desirability of reinforcing the tines at their juncture with header 10 as has been illustrated in some detail in FIGURE 2.

It is believed that it will be clearly apparent from the above description and the disclosure in the drawings that the invention comprehends a novel construction of a fertilizer applying device.

Having thus disclosed the invention, I claim:

A fertilizer applying device, comprising: a tubular metal header having an interior fertilizer receiving chamber and closure means therefor; said header having a plurality of aligned tine positioning interiorly threaded bosses communicating with said chamber, said bosses being spaced apart along the length of said header and positioned to lie in a common plane; a plurality of substantially straight tubular tines each having a threaded end; said tines threadedly secured in said bosses and in communication with said fertilizer receiving chamber, said tines having at their ends opposite their threaded ends a discharge end having uniformly machined extreme ends; a hose receiving boss formed as part of said header and disposed at right angles to the plane of said tines; a handle receiving socket disposed substantially in the mid-portion of said header, fixedly secured to the same and substantially in the plane of the tines and on the opposite side from said tines, and a handle secured in said socket and lying in the approximate plane of said socket, the forward ends of said tines terminating in a tapered exterior portion adjacent the discharge ends of said tines and said tine bosses having tine engaging threads in their upper portions adjacent said header and a guide bore in the bottom portions of said tine bosses having a diameter greater than the outside threaded diameter of said threaded tines and supporting said tines against bending.

References Cited in the file of this patent

UNITED STATES PATENTS

| | | |
|---|---|---|
| 492,647 | Wells | Feb. 28, 1893 |
| 563,195 | Lyon | June 30, 1896 |
| 708,126 | Chase | Sept. 2, 1902 |
| 1,525,571 | Cypert | Feb. 10, 1925 |
| 2,018,003 | Axtell | Oct. 22, 1935 |
| 2,027,005 | Tatroe | Jan. 7, 1936 |
| 2,140,266 | Leeberg | Dec. 13, 1938 |
| 2,172,574 | Campbell | Sept. 12, 1939 |
| 2,505,174 | Daniels | Apr. 25, 1950 |

FOREIGN PATENTS

| | | |
|---|---|---|
| 176,703 | Austria | Nov. 25, 1953 |